United States Patent
Walker et al.

(10) Patent No.: US 8,262,784 B2
(45) Date of Patent: Sep. 11, 2012

(54) REGENERATIVE ADSORPTION GAS DRYER

(75) Inventors: Brian Walker, Washington (GB); Peter Carney, Washington (GB)

(73) Assignee: Walker Filtration Limited, Tyne and Wear (GB)

( * ) Notice: Subject to any disclaimer, the term of this patent is extended or adjusted under 35 U.S.C. 154(b) by 295 days.

(21) Appl. No.: 12/682,719

(22) PCT Filed: Oct. 13, 2008

(86) PCT No.: PCT/GB2008/003452
§ 371 (c)(1),
(2), (4) Date: Apr. 12, 2010

(87) PCT Pub. No.: WO2009/047530
PCT Pub. Date: Apr. 16, 2009

(65) Prior Publication Data
US 2010/0212505 A1  Aug. 26, 2010

(30) Foreign Application Priority Data
Oct. 11, 2007  (GB) .................................. 0719917.7

(51) Int. Cl.
*B01D 53/02* (2006.01)
(52) U.S. Cl. ................. 96/110; 96/116; 96/121; 96/133; 96/134; 96/144
(58) Field of Classification Search .................... 96/110, 96/118, 121, 133, 143; 95/117, 121, 122, 95/148
See application file for complete search history.

(56) References Cited

U.S. PATENT DOCUMENTS

| 4,391,289 A | 7/1983 | Adams |
| 4,425,142 A * | 1/1984 | Mann .............................. 95/106 |
| 5,344,474 A * | 9/1994 | Null .............................. 55/344 |
| 6,094,836 A | 8/2000 | Mahoney et al. |
| 6,200,365 B1 | 3/2001 | Eimer et al. |
| 6,951,581 B2 * | 10/2005 | Fornof et al. .................. 95/122 |
| 7,000,332 B1 * | 2/2006 | Fresch et al. .................. 34/330 |
| 2004/0020366 A1 * | 2/2004 | Walker et al. .................. 96/133 |
| 2005/0188848 A1 | 9/2005 | Salzman et al. |

FOREIGN PATENT DOCUMENTS

| EP | 1378286 A | 1/2004 |
| GB | 450851 A | 7/1936 |
| WO | WO98/18538 A | 5/1998 |

* cited by examiner

*Primary Examiner* — Duane Smith
*Assistant Examiner* — Christopher P Jones
(74) *Attorney, Agent, or Firm* — Egbert Law Offices PLLC

(57) ABSTRACT

A regenerative adsorption gas dryer has a wet gas inlet, first and second drying towers, and a dried gas outlet. The inlet, towers and outlet are arranged such that, in use, a flow of purge gas regenerates an off-stream one of the towers, while a stream of wet gas from the wet gas inlet enters an on-stream one of the towers to exit that tower as a stream of dried gas which then continues to the dried gas outlet. The roles of the off-stream and on-stream towers are reversible. The dryer further has a first check valve for controlling a stream of dried gas between the first drying tower and the dried gas outlet, and a second check valve for controlling a stream of dried gas between the second drying tower and the dried gas outlet.

6 Claims, 3 Drawing Sheets

REGENERATIVE ADSORPTION GAS DRYER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to regenerative adsorption gas dryers and desiccant cartridges for such dryers.

2. Description of Related Art Including Information Disclosed Under 37 CFR 1.97 and 37 CFR 1.98

Adsorption dryers for compressed air and gases have been known for many years and are widely used throughout the world. Although other types of dryer are available, such as deliquescent and refrigeration dryers, these cannot give a pressure dew-point as low as that achieved by adsorption dryers.

Normally, adsorption dryers are dual tower dryers. That is to say, they include two towers of desiccant material (commonly known as beds) one of which is "on-stream" drying the gas whilst the other is "off-stream" and being regenerated. In a dual tower dryer, the gas to be dried is passed through the desiccant bed of the on-stream tower continuously, in one direction, during a drying cycle. Then, after a predetermined time interval (this interval being chosen such that the bed will have adsorbed sufficient moisture) the inlet gas is switched to the desiccant bed of the other tower and the first desiccant bed is regenerated by some suitable procedure such as heating, evacuation or passing a purge gas through it, usually in a flow direction opposite to the flow of gas to be dried.

A heatless dryer typically uses a purge flow of dry gas, which is usually a proportion of dried gas from the on-stream tower, the purge gas being passed through the regenerating bed at a lower pressure than the gas in the on-stream tower. The dryer is normally operated on a fixed time cycle for drying and regeneration and both cycles are usually of an equal duration, or they can be operated in a variable cycle. The cycle times for heatless dryers are usually measured in minutes.

To control the flow of gas from one tower to the other, and to control the purge gas, a series of valves is employed. These valves typically include inlet valves which switch the gas from one tower to the other, exhaust valves which control the duration of purge gas flow and repressurisation of the towers, and outlet valves which prevent the outlet stream pressurizing the off-stream bed. Other valves may also be required.

The applicant's earlier application, EP 1378286, discloses a dryer in which an incoming wet gas stream enters a first manifold at the head of the towers and is then directed to a second manifold at the foot of the towers. A first shuttle valve in the second manifold directs the wet gas stream into the on-stream tower. The gas flows through the tower back to the first manifold where it meets a second shuttle valve which is positioned to allow flow of the dried gas out of the manifold.

As the dry gas flows back into the first manifold from the on-stream tower, a small bleed of the dry gas is channeled off through a purge gas passageway in the manifold to the off-stream tower. The purge gas expands as it passes through orifices in the gas passageway so that, on entry into the off-stream tower, it is substantially at atmospheric pressure. The purge gas is channeled back down to the second manifold through the off-stream tower thus regenerating the desiccant in the tower. The purge gas exits the off-stream tower into the second manifold where it is exhausted from the drier by an exhaust valve for that tower.

The action of the gas passing through the exhaust valves of the towers is responsible for the control of the first shuttle valve in the second manifold. If gas is being exhausted from the exhaust valve of one tower, the first shuttle valve switches to ensure that wet gas yet to be dried is channeled into the other tower. The pressure of the dried gas exiting the other tower then ensures that the second shuttle valve switches to allow flow of the dried gas out of the first manifold.

However, expensive manufacturing processes, such as machining or complex casting, are generally needed to form the manifolds, shuttle valves and gas passageway. Further, locating the shuttle valves and gas passageway in the manifolds can make them difficult to access for maintenance, and can make them expensive to alter if valves and passageways with different flow characteristics are required.

BRIEF SUMMARY OF THE INVENTION

It is an aim of the present invention to alleviate such problems associated with known dryers.

Accordingly, a first aspect of the invention provides a regenerative adsorption gas dryer having a wet gas inlet, first and second drying towers, and a dried gas outlet, the inlet, towers and outlet being arranged such that, in use, a flow of purge gas regenerates an off-stream one of the towers, while a stream of wet gas from the wet gas inlet enters an on-stream one of the towers to exit that tower as a stream of dried gas which then continues to the dried gas outlet, the roles of the off-stream and on-stream towers being reversible; wherein the dryer further has:

a first-check valve for controlling a stream of dried gas between the first drying tower and the dried gas outlet, and a second check valve for controlling a stream of dried gas between the second drying tower and the dried gas outlet, the first and second check valves being arranged such that the pressure of the stream of dried gas exiting the on-stream tower opens the check valve of that tower to allow the stream of dried gas to continue to the dried gas outlet, and such that the pressure of the stream of dried gas from the on-stream tower closes the check valve of the off-stream tower; and a first by-pass to the first check valve and a second bypass to the second check valve, each by-pass allowing a restricted flow of gas to be extracted from the stream of dried gas from the on-stream tower to form the flow of purge gas for the off-stream tower.

Each check valve may have a valve body which moves relative to a valve seat to open and close the valve, the respective by-pass being formed as a gas passage through the valve body, thereby eliminating the need for expensive complex manufacturing processes to provide manifolds or valve blocks with complicated valve assemblies therein.

A purge seal may be provided in each check valve to allow the formation of an airtight seal between each valve body and the respective valve seat during regeneration.

Each check valve may have a cleaning pin which inserts into the gas passage and moves relative thereto on movement of the valve body. Therefore, during operation of the regenerative adsorption gas dryer, the pin can maintain the gas passage clear of blockages without the need for intervention by a user.

A regenerative adsorption gas dryer according to the present invention may further include a shuttle valve which directs the stream of wet gas from the wet gas inlet to the on-stream tower and shuts off the stream of wet gas to the off-stream tower.

A regenerative adsorption gas dryer according to the present invention may further have a first filter for the first tower and a second filter for the second tower, each filter being suitable for filtering the stream of dried gas from the on-stream tower before it reaches the check valve of that tower, thereby advantageously helping to prevent the check valve from blocking up.

Preferably, each tower has a replaceable desiccant cartridge for drying the stream of wet gas into that tower. The respective check valve and by-pass for the tower may be incorporated into the desiccant cartridge, advantageously also being replaceable therewith. Indeed, the respective filter may also be incorporated into the desiccant cartridge, advantageously also being replaceable therewith.

Accordingly, a user can replace the desiccant, the check valve, the by-pass and the filter simply and easily by substituting a new cartridge for a used one. Therefore, another aspect of the present invention is to provide a desiccant cartridge incorporating a respective check valve and by-pass for a tower of the regenerative adsorption gas dryer according to the first aspect. Such a desiccant cartridge may also incorporate the respective filter for that tower.

BRIEF DESCRIPTION OF THE SEVERAL VIEWS OF THE DRAWINGS

The present invention will now be described in more detail by way of example only, with reference to the accompanying figures, in which.

DETAILED DESCRIPTION OF THE INVENTION

Figure 1:
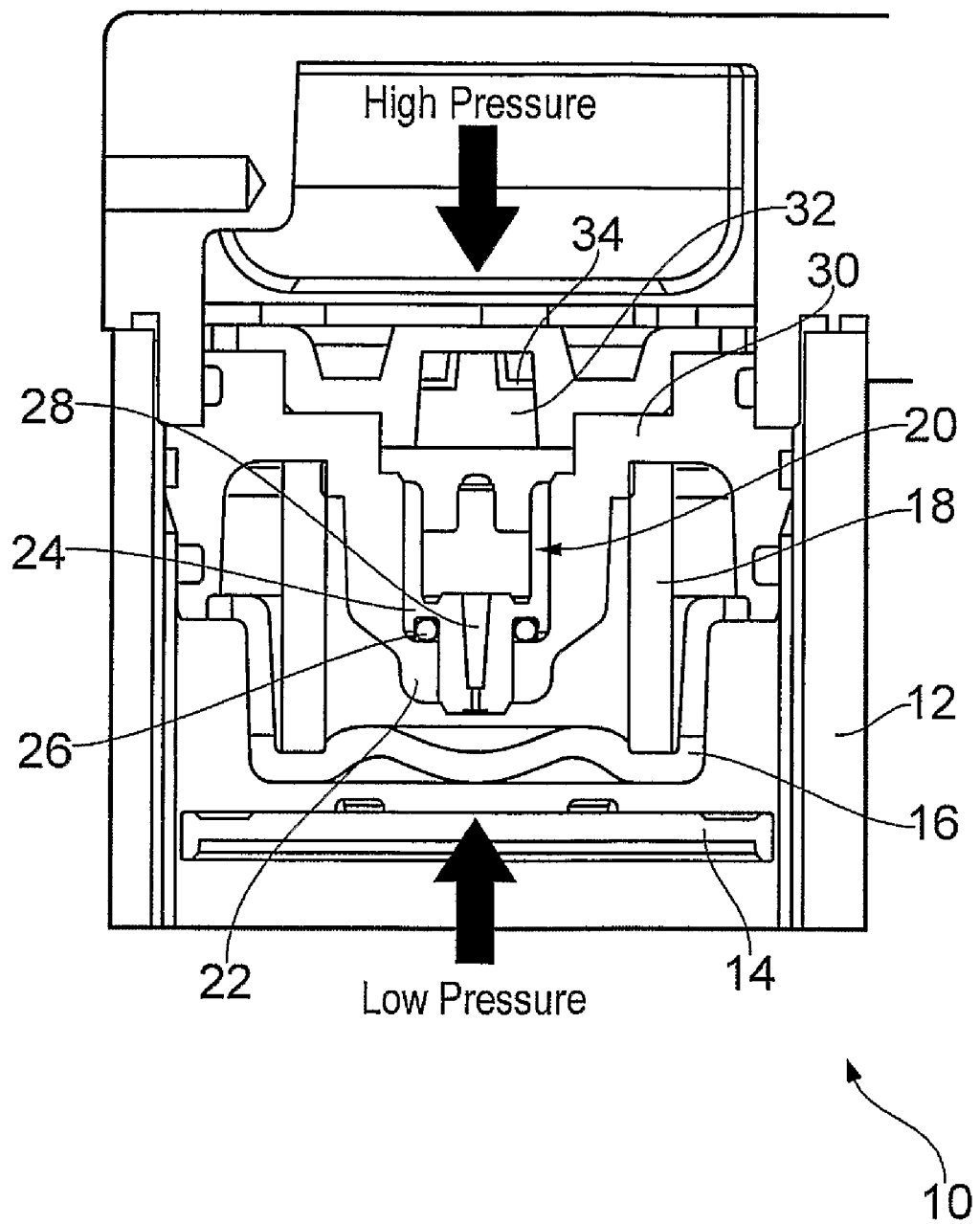
FIG. 1 shows a cross-sectional view of a portion of a tower of a regenerative adsorption gas dryer according to the present invention.

A regenerative adsorption gas dryer according to the present invention has a wet gas inlet (not shown), a dried gas outlet (not shown) and first and second drying towers. An example of a portion of a suitable drying tower 10 for use as a first or second drying tower according to the present invention is shown in FIG. 1. As will become clear from below, in use, such an arrangement allows for radial, axial or multiple flow paths. Different flow paths generate different back pressures, which can be either harmful or beneficial to the drying process. Thus, the arrangement described below advantageously provides flexibility in the choice of flow path.

The tower 10 includes a tower body 12 which may be arranged upright, and which houses a desiccant (not shown) to one side of a desiccant screen 14 and a filter cage 16 to the other side of the desiccant screen 14. The filter cage 16 holds in place a filter body 18 for filtering a stream of gas. The filter body 18 is preferably capable of filtering a gas stream flowing through it in either direction. The filter body 18 may be fixedly mounted in the tower 10, or it may be removably mountable in the tower 10.

A check valve assembly 20 is mountable in the tower 10 to be in fluid communication with the desiccant via the filter body 18. The check valve assembly 20 includes a valve seat member 22 and a valve body 24 movable with respect to the valve seat member 22.

The valve body 24 is preferably formed from a plastic material and/or from metal. The valve body 24 is preferably formed by a machining, moulding, casting and/or an extrusion technique.

The valve body 24 and the valve seat member 22 can be configured to form an air tight seal. The sealing arrangement between the valve body 24 and the valve seat 22 shown in FIG. 1 includes a face seal. However, other sealing arrangements are also envisaged, for example a piston seal or a corner seal.

The valve body 24 and/or the valve seat 22 may include a sealing member 26 to help form such an airtight seal. In FIG. 1, such a sealing member 26 is provided in the valve body and is in the form of an o-ring. However, the sealing member 26 could be a flat seal, a lip-seal or a live hinge type seal.

The valve assembly may be fixedly mounted in the tower, but preferably it is removably mounted in the tower. The valve assembly is preferably mounted in a cartridge 30 having a cap 32, which may be removable to allow user access to at least the valve body 24, e.g. for maintenance of the valve assembly or to facilitate replacement of the valve body 24. The cartridge 30 and/or the cap 32 preferably includes a gas passage for allowing a stream of gas to be communicated to and from the valve assembly 20. The cartridge is preferably removably mountable in the tower.

In FIG. 1, the valve body 24 is shaped to form a gas passage 28 to allow a stream of gas to by-pass the valve seal formed by the valve body 24 and the valve seat 22, when the respective tower is configured to be off-stream, as shown in FIG. 1.

An off-stream tower is a tower configured to prevent a wet gas stream from being communicated from the wet gas inlet to the respective dried gas outlet via the desiccant of that tower, and configured to communicate dry gas to the desiccant of that tower, e.g. to purge the off-stream tower and/or to regenerate a desiccant in the off-stream tower. Conversely, an on-stream tower is a tower which is configured to communicate a stream of wet gas from the wet gas inlet to the respective dried gas outlet via the desiccant in that tower, such that the desiccant is able to dry the wet gas.

In use, one of the first and second towers is off-stream when the other tower is on-stream, but this is reversible. To avoid repetition, the present invention will be discussed so that the first tower is described as being on-stream and the second tower as being off-stream. However, it is envisaged that in use the roles of the first and second tower will be swapped periodically over time.

To maintain the gas passage 28 free of blockages, a penetrating member, such as a pin, (not shown) may be provided to be insertable to the gas passage 28. The penetrating member may be configured to penetrate the gas passage 28 when the respective tower is on-stream. For example, the penetrating member may be provided such that when the valve body 24 separates from the valve seat 22, upon introduction of (e.g. wet) gas of a suitable pressure to the tower 10, the gas passage accepts the penetrating member. The penetrating member may be formed of suitably rigid plastic material and/or of metal, and it may be provided on the underside of the cap 32 shown in FIG. 1

The size of the gas passage 28 may be adjustable. For example, the gas passage may include a needle valve, which may alter the size of the gas passage 28 in response to the pressure difference across the valve assembly. The size of the gas passage 28 may be adjustable, e.g. by a user, to one of a plurality of predetermined sizes, thereby being capable of moderating the extent of flow of the purge gas.

The valve body 24 may be replaceable to allow for a range of gas pressures and flow rates to be achievable in the respective on-stream and off-stream towers.

The desiccant may be provided in a removable cartridge 30. Such a removable cartridge 30 may also include cartridge components such as a filter body 18, a valve assembly 20, a valve body 24, a filter cage 16, a desiccant screen 14 and/or a cap 32; thereby providing an easily serviceable and interchangeable unit for a regenerative adsorption gas dryer according to the present invention. One or more of the cartridge components may themselves be removable from the cartridge. The respective cartridge components may be formed of a plastics material and/or of metal. The removable cartridge may be mountable to a tower by a bayonet fixing, the cartridge and the tower having complementary bayonet elements allowing the cartridge to be detachably mounted to the tower.

Figure 2:
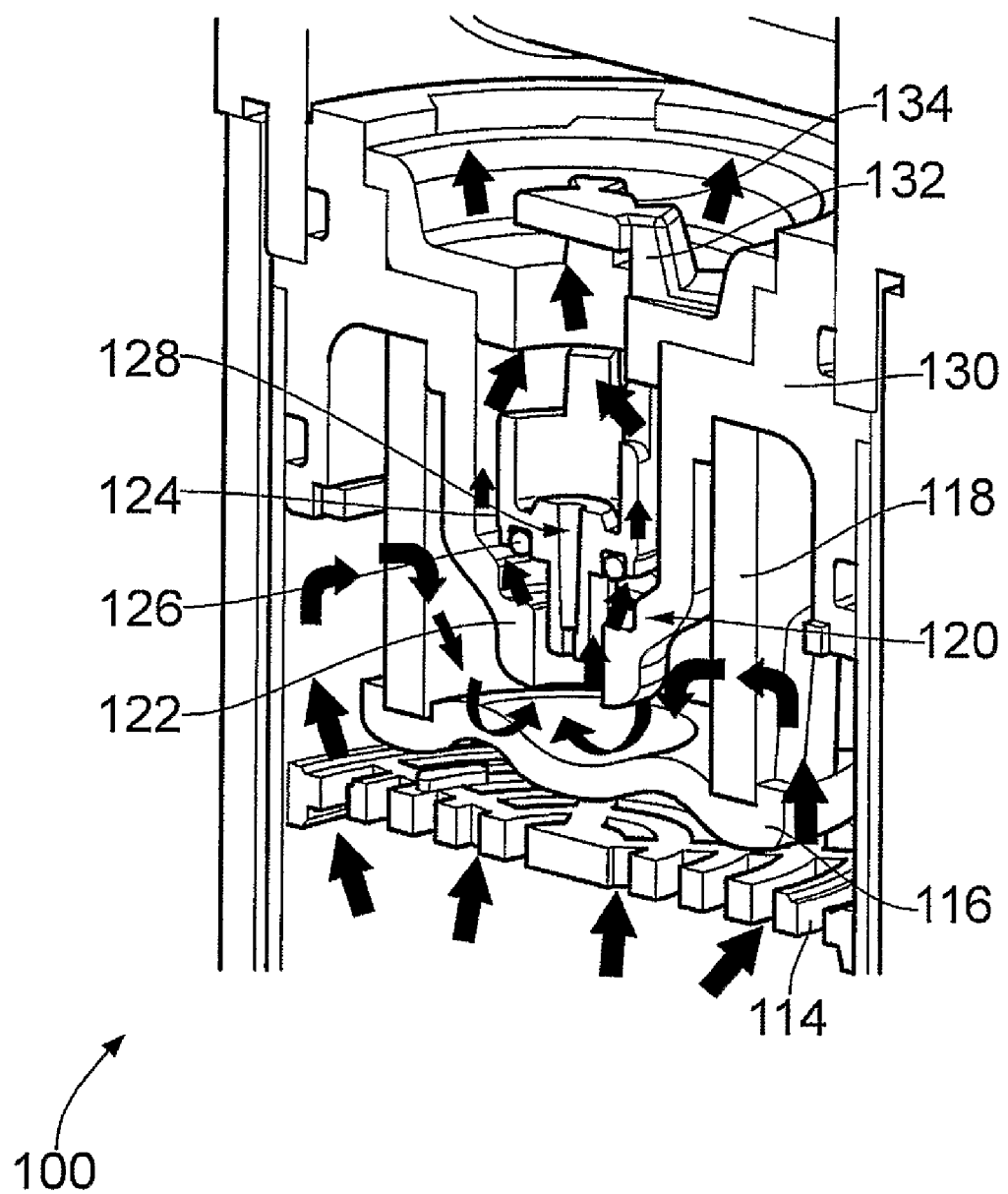
FIG. 2 shows a perspective sectional view of a portion of an on-stream tower of a regenerative adsorption gas dryer according to the present invention.

In the use of a preferred embodiment of a dryer according to the present invention, a stream of wet gas is input to the wet gas inlet and is guided to an entrance of the first (on-stream) tower 100, as shown in FIG. 2. The gas stream is communicated to the desiccant screen 114 via the desiccant (not shown) in the first tower 100. The desiccant dries the gas such that dried gas arrives at the desiccant screen 114.

The dried gas is then communicated to the valve assembly 120 via the desiccant screen 114 and the filter body 118, which is held in place by at least the filter cage 116. The pressure of the dried gas opens the valve assembly 120. In an on-stream tower, the filter body 118 preferably filters the dried gas stream upstream relative to the valve assembly 120, thereby protecting against the ingress of unwanted particles to the valve assembly 120 which might otherwise adversely affect its operation.

In the embodiment shown in FIG. 2, the valve assembly 120 includes a check valve which is openable in response to a pressure difference across the valve body 124 which can overcome the sealing force, e.g. provided by the weight of the valve body 124 on the valve seat 122. In an alternative valve assembly, an active bias may be provided to close the valve assembly 120. For example, a spring member may be provided to urge the valve closed, in which case the pressure differential across the valve body should be sufficient to overcome the biasing force provided by the spring member.

If the tower is intended to be used other than in an upright configuration, it is preferred if the desiccant is held in place by a biasing means, e.g. a spring-loaded bed, which allows for non-upright, e.g. horizontal, operation. Furthermore, using a biasing means reduces desiccant movement and desiccant attrition which undesirably results in the creation of dust.

The dried gas is communicated by the valve assembly 120 and via apertures 134 in cap 132 and/or cartridge 130 to the dried gas outlet (not shown).

Figure 3:
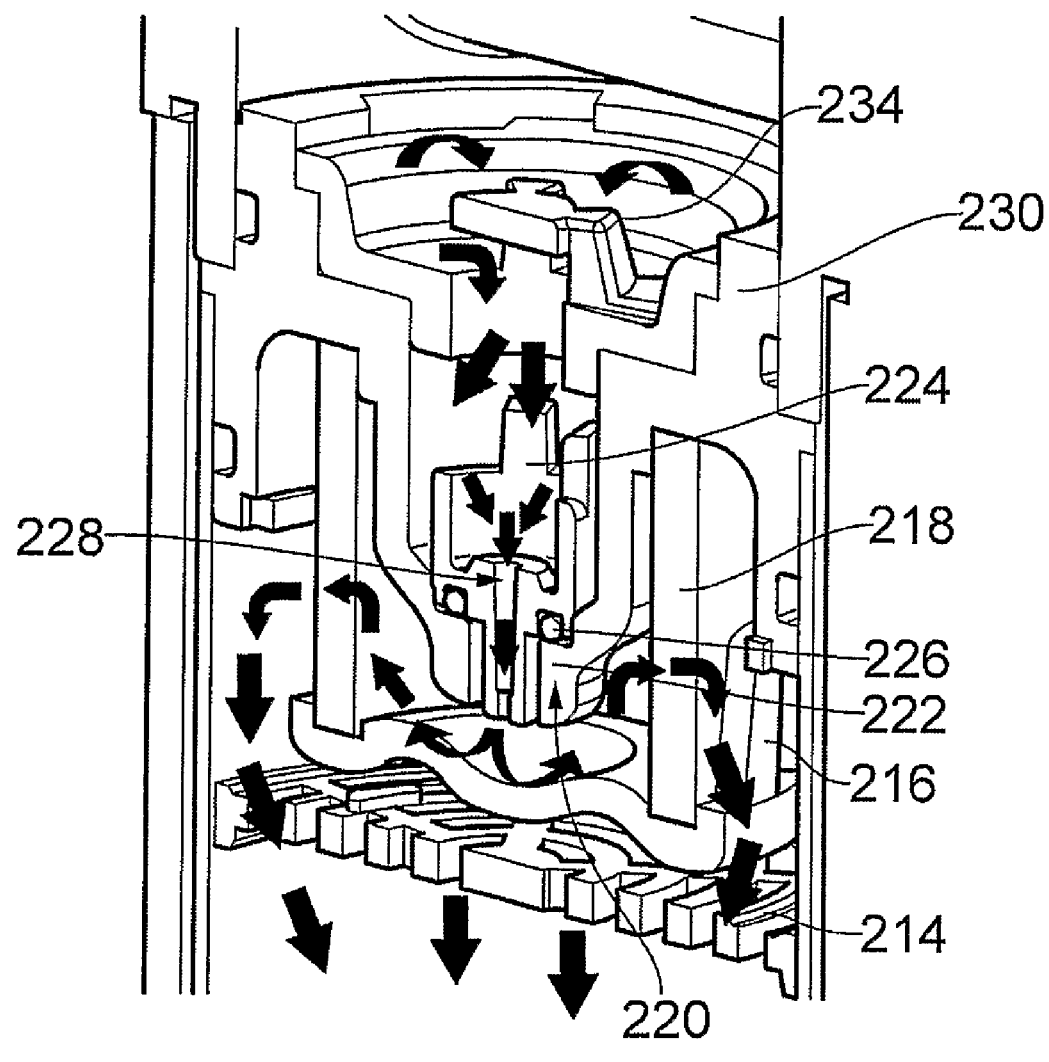
FIG. 3 shows a perspective sectional view of a portion of an off-stream tower of a regenerative adsorption gas dryer according to the present invention.

The structure of the (off-stream) second tower 200, a portion of which is shown in FIG. 3, is similar to the first tower 100.

The first and second towers 100 and 200 are in fluid communication such that the pressure of the dried gas stream from the first tower 100 closes the valve assembly 220 in the second tower 200. The pressure in the second tower 200 can be maintained lower than the pressure of the dried gas stream by pressure release valves (not shown).

However, the valve assembly 220 includes a valve assembly bypass in the form of a gas passage 228, which is suitable for communicating a restricted flow of dried gas, a purge gas, from the dried gas stream to the desiccant (not shown) of the second tower 200.

The purge gas is communicated to the desiccant via the filter body 218 and the desiccant screen 214. As the purge gas passes by the desiccant to an outlet, it can extract moisture from the desiccant to regenerate the desiccant, e.g. if the second tower had previously been used as an on-stream tower. If the second tower is already dry, and the desiccant therein does not need further drying, the purge gas can help to keep the tower dry.

The valve body 124 of the first tower 100 also includes a gas passage 128. Therefore, at an appropriate time, the roles of the first and second towers 100 and 200 can be reversed, thereby purging the first tower 100 and making use of the (regenerated) dry desiccant in the second tower 200 to dry wet gas input to the wet gas inlet. The gas passage 128 allowing the desiccant in the first tower 100 to be regenerated in a similar way to that described above in relation to the second tower 200.

The appropriate time to swap the roles of the towers may be determined by the volume of dry air exiting the dried gas outlet, or by a user, e.g. on the basis of the relative moistness of the respective desiccants in the first and second towers 100 and 200.

The wetted purge gas, i.e. the purge gas downstream of the desiccant being regenerated, may be added to the wet gas, input to the wet gas inlet, to be dried by the on-stream tower.

If the same filter body is retained in a tower when reversing the role of the tower from on-stream to off-stream, the purge gas in the off-stream tower can be used to dislodge particles from the filter body, which may be present in the filter body as a result of the filtering of the dried gas when the tower was on-stream.

Whilst it is preferred that a filter body is included in a tower according to the present invention, it is not essential to do so. The valve assembly may be located at the top of the cartridge or the tower, but it may be provided elsewhere, e.g. at the bottom. Indeed, the respective valve assemblies may be directly mounted in a valve block or a manifold including the dried gas outlet.

For a more detailed description of some of the features described above which are not shown in the figures, reference can be made to European patent publication no. EP1378286. For the avoidance of doubt, it is stated here that all documents mentioned in this text are incorporated herein by reference.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

We claim:

1. A regenerative adsorption gas dryer having a wet gas inlet and a first drying tower and a second drying tower and a dried gas outlet in which the wet gas inlet and the first and second drying towers and the dried gas outlet are arranged such that a flow of purge gas regenerates an off-stream in one of said first and second drying towers and in which a stream of wet gas from the wet gas inlet enters an on-stream in one of the first and second drying towers so as to exit the tower as a stream of dried gas so as to continue to the dried gas outlet, the towers for the off-stream and the on-stream being reversible, the regenerative adsorption gas dryer further comprising: a first check valve suitable for controlling the stream of dried gas between the first drying tower and the dried gas outlet; a second check valve suitable for controlling the stream of dried gas between the second drying tower and the dried gas outlet, said first and second check valves being arranged such that a pressure of the stream of dried gas exiting the tower with the on-stream opens the check valve of the tower so as to allow the stream of dried gas to continue to the dried gas outlet and such that a pressure of the stream of dried gas from the tower with the on-stream closes the check valve of the tower with the off-stream; a first bypass to the said first check valve; and a second bypass to said second check valve, each of said first and second bypasses allowing a restricted flow of gas to be extracted from the stream of dried gas from the tower having the on-stream so as to form the flow of purge gas for the tower having the off-stream, each of the first and second drying towers having a replaceable desiccant cartridge, said desiccant cartridge suitable for drying the stream of wet gas into the towers, said first and second check valves and said first and second bypasses being respectively incorporated into the desiccant cartridge and are replaceable therewith.

2. The regenerative adsorption gas dryer of claim 1, wherein each of said first and second check valves has a valve body which moves relative to a valve seat so as to open and close the check valve, said first and second bypasses respectively formed as a gas passage through the valve bodies.

3. The regenerative adsorption gas dryer of claim 2, each of said first and second check valve having a cleaning pin which is insertable into the gas passage and moves relative thereto by a movement of the valve body.

4. The regenerative adsorption gas dryer of claim 1, further comprising:
a first filter positioned on said first drying tower; and
a second filter positioned on said second drying tower, each of said first and second filters suitable for filtering the stream of dried gas from the tower having the on-stream before the stream of dried gas reaches the check valve of that tower.

5. The regenerative adsorption gas dryer of claim 4, the first and second filters being incorporated into the respective desiccant cartridges and being replaceable therewith.

6. The regenerative adsorption gas dryer of claim 1, the desiccant cartridges incorporating the respective check valve so as to control the stream of dried gas, the desiccant cartridge incorporating the bypass to that check valve.

* * * * *